Sept. 20, 1938.   R. RÜDENBERG   2,130,903
APPARATUS FOR PREVENTING RESONANCE
Filed Feb. 27, 1936   2 Sheets-Sheet 1

WITNESSES:
Michael Stark
Geo. C. Groome

INVENTOR
Reinhold Rudenberg
BY
Paul E. Friedemann
ATTORNEY

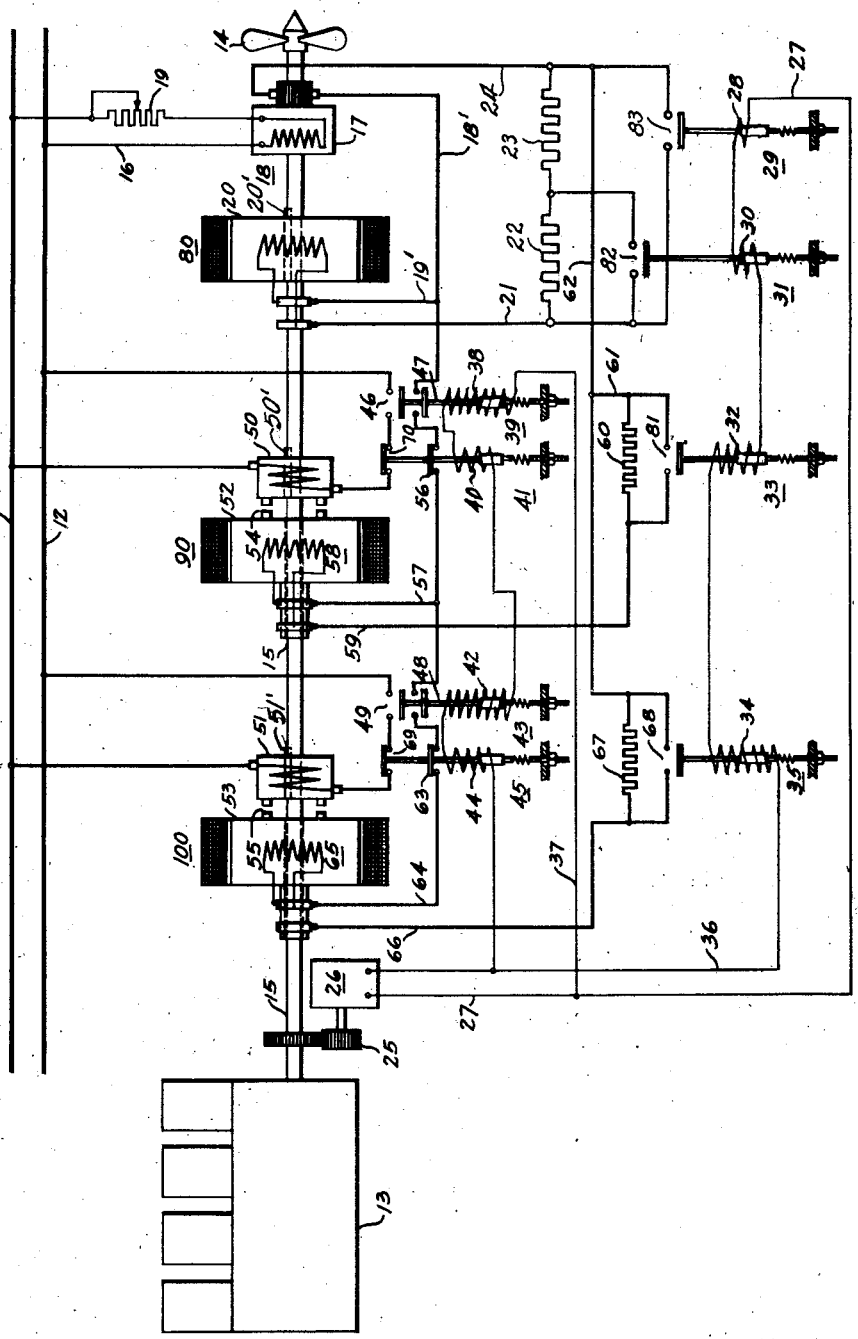

Patented Sept. 20, 1938

2,130,903

UNITED STATES PATENT OFFICE 2,130,903

APPARATUS FOR PREVENTING RESONANCE

Reinhold Rüdenberg, Berlin-Grunewald, Germany, assignor to Westinghouse Electric & Manufacturing Company, East Pittsburgh, Pa., a corporation of Pennsylvania Application February 27, 1936, Serial No. 66,138
In Germany March 7, 1935

5 Claims. (Cl. 188—104)

In devices or apparatus using rotating shafts which are driven at variable speeds, the fact must be taken into consideration that when the frequency of the exciting forces, namely, the frequency of rotation of the shaft being operated, is in resonance with the natural frequency of the entire apparatus very strong mechanical stresses are produced in the shafts. To avoid such critical rotational speeds of a shaft, the shaft is either operated at a speed which is in all cases smaller than the critical rotational speed or care is taken that when the speed is changed, the critical rotational speed is rapidly passed. In the first case the difficulty is involved that the weight of the shaft becomes very large. The second method can only be applied in cases where the normal operating rotational speeds may be so selected that they lie outside of the range of critical speeds. This is however not possible in many cases; particularly in the cases in which it is desirable that the shaft operate at a definite large rotational speed range in which each desired rotational speed is to be included.

To avoid the danger which arises when the critical rotational speed is passed, the most varied mechanical and electromagnetic oscillation dampers have already been proposed; the operation of all of these depends on the conversion of the oscillation energy into mechanical or electrical energy for example in the form of heat or electrical energy conducted away to an external point. In all of these cases, damping of the oscillations takes place at the critical rotational speed by the destruction of energy.

It is an object of my invention to eliminate resonance between the shaft, or element, operating at variable frequency and the natural frequency of the apparatus and shaft with which the shaft is associated.

It is an object of my invention to change the natural frequency of a machine as an element of the machine operating at a variable frequency approaches the natural frequency whereby dangerous oscillations of the machine by reason of resonance are avoided.

It is also an object of my invention to gradually change the natural frequency of a machine as the frequency of an element of the machine operating at varying speeds varies.

A still further object of my invention is to change the natural frequency of a machine as an element of the machine operating at variable frequency approaches a critical speed at which resonance might occur to thus prevent dangerous stresses in such machine by reason of the resonance oscillations that would otherwise be set up.

It is also an object of my invention to successively change the natural frequency of a machine as an element of the machine, operating over a wide speed range, approaches successive critical speeds at which speeds resonance might occur to thus prevent dangerous stresses in such machine by reason of the resonance oscillations that would otherwise be set up.

The procedure according to the invention is in accordance with a basically different principle in contrast to the devices heretofore proposed. According to the invention, resonance oscillation between the characteristic oscillations and the forced oscillations of variable frequency are suppressed with the aid of an auxiliary oscillating system which so changes the elasticity of these systems that an oscillation nodal point of the resulting oscillation systems always corresponds to the forced frequency.

Other objects and advantages will become more apparent from a study of the following specification when considered in conjunction with the accompanying drawings, in which:

Fig. 6 shows a system of control for automatically preventing resonance in a system having a plurality of critical speeds.

Figure 1:
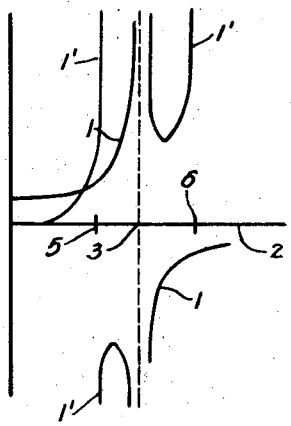
Fig. 1 illustrates the resonance curve of a simple oscillating system.
Figure 2:
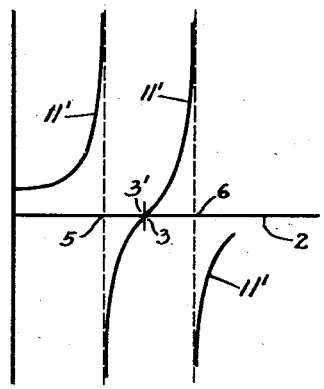
Fig. 2 illustrates the resonance curve when the natural frequency of a simple oscillating system is changed by coupling a second oscillating system of known characteristics to it.

To facilitate the understanding of the invention, the procedure is to be explained with reference to a simple oscillating system. In Fig. 1 the resonance curve 1 of a simple oscillating system is illustrated. The amplitude of the forced oscillations are plotted as ordinates with reference to the frequency of the rotating member measure along the abscissa 2. The oscillation system has a natural frequency evidenced by point 3. As the exciting frequency, changing toward the right on the abscissa of the coordinates shown in Fig. 1, approaches the value of the natural frequency, the amplitudes continually increase. Neglecting the dissipation of any energy in the oscillating system, the amplitudes become infinite, as at point 3, when the exciting frequency and the natural frequency are in tune. These oscillations may be suppressed in the region of the natural frequency by preventing a tuning of the exciting frequency and the natural frequency. This may be accomplished by coupling a second oscillation system having natural or critical frequencies that occur at points that do not correspond to the natural frequency of the first oscillation system. Let the curve 1' represent the amplitudes of oscillation of the second system alone when such second system is subjected to the same exciting frequency to which the first oscillating system is subjected. If the two systems are coupled then the resulting system will have the resonance curves 11' illustrated in Fig. 2. For a frequency 3' of this resulting oscillating system a nodal point of the resonance curves is now present and the first oscillating system is completely at rest. When the characteristic frequency 1', shown in Fig. 1, of the damper is tuned to the characteristic frequency 3 of the first oscillating system, the frequencies 3' and 3 are in tune. This case is illustrated in Fig. 2. However, now two new resonance points 5 and 6, at which the amplitudes become infinite manifest themselves above and below the frequency 3'. The distance of both frequencies from the zero amplitude frequency is dependent on the mass relationships of the two oscillating systems. For a small mass of the damper, the resonance frequencies 5 and 6 are very close to the zero frequency 3'.

Figure 3:
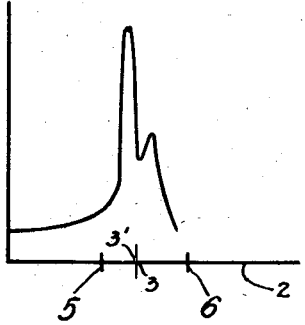
Fig. 3 illustrates the resonance curve when an oscillating system of known characteristics, added to a system including a machine element of variable frequency, is associated with a damper providing energy dissipation.

If I am confronted with the problem of preventing the dangers arising from resonance not only in a system in which the excitation is at a single highly definite frequency but also in machines with variable frequency the arrangement of tuning in this manner does not suffice since when the excitation is at the frequencies 5 or 6 very large amplitudes manifest themselves. If oscillation dampers, the elasticity and mass of which are constant, are utilized, the only remedy remaining is to avail myself of damping by energy consumption and to introduce into the damper energy dissipation. By this means the resonance curve is given the form shown in Fig. 3. At the frequency 3' oscillations of appreciable magnitude again take place; on the other hand at the frequencies 5 and 6 the amplitude has become moderate. The introduction of energy dissipation proportional to frequency 3, with either a simple oscillating system or a resulting oscillating system as discussed in connection with Figs. 1 and 2, respectively, accordingly leads to appreciable retrogression.

Figure 4:
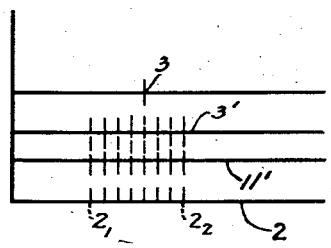
Fig. 4 illustrates the variations in frequency of the added oscillating system whose natural frequency is changed with speed variations of the element, or shaft, of a machine.

According to the invention the characteristic or natural frequency of an auxiliary oscillating system is so changed when the frequency of the produced oscillations change that the zero amplitude frequency of the resulting oscillating system is always in tune with the excitation frequency and thus energy dissipation in a mechanical or electrical damping device is rendered unnecessary. In applying the invention to mechanical rotational oscillations, the oscillation zero position is changed in proportion with the rotational speed. The zero position 3' shown in Fig. 2 accordingly moves with the exciting frequency by changing the characteristic or natural frequency of the auxiliary oscillating system. This is schematically shown in Fig. 4. Here the characteristic frequency 3 and the exciting frequency are plotted. The upper line shows the original characteristic frequency 3 of the first oscillating system. Below the adjustable characteristic frequencies 11' of the oscillation damper are represented. By the cooperation of both oscillating systems the zero frequency position 3' of the resonance curve results, and this moves along with the exciting frequency over the whole critical frequency range from $z_1$ and $z_2$ of normal operating speeds of the rotating system. Since the exciting frequencies are as a rule proportional to the rotational speed and are given by the zero positions 3' of the characteristic frequency 11' of the oscillation dampers (as a rule 3' and 11' are in tune) the proper dependence of the excitation on the rotational speed may easily be determined.

The proposal has already been made to adjust the damping force in electromagnetic oscillation dampers which operate on the principle of energy dissipation in the neighborhood of resonance. However, this only serves the purpose of controlling the magnitude of energy dissipation. In these proposed devices the danger is always present that the system may be easily led into the remaining neighboring resonance regions. In contrast to this, the resonance between the characteristic oscillations of the system and the forced oscillations of variable frequency are prevented for each operating case and the original oscillating system is brought to rest in accordance with the invention without special energy dissipation, accordingly without loss and with small auxiliary masses.

When a plurality of characteristic frequencies are involved, accordingly for example a plurality of critical rotational speed ranges, it is naturally essential in the transition from one range to another to jump with the zero position in the region of the new exciting frequency. The proportionality between exciting frequency and rotational speed exists in general only for a single region; in another region other harmonics of the rotational speed may become effected.

The effects of the auxiliary oscillating system are preferably produced electromagnetically for example by the operation of a rotational magnet mounted on a shaft and by adjustment of the excitation current. The auxiliary oscillating system is preferably given an energy consumption damping which is as small as possible for the purpose of obtaining a sharp oscillation zero position.

The damping force of an electromagnetic coupling is for small magnetic saturation of the iron parts proportional to the square of the exciting current, and since the characteristic frequency for a given mass of the coupling is always proportional the root of the elastic force it is accordingly directly proportional to the exciting current. Since now the frequency of the oscillation zero position and therefore also the characteristic frequency of the auxiliary oscillating system must be proportional to the rotational speed of the system to obtain good oscillation damping for mechanical rotational oscillations, it follows that the exciting current is to be changed preferably in proportion to the rotational speed. This may be attained in simple manner automatically by deriving the excitation current from an externally excited direct current machine which is driven from the shaft that is to be damped directly or through a translational drive.

Figure 5:
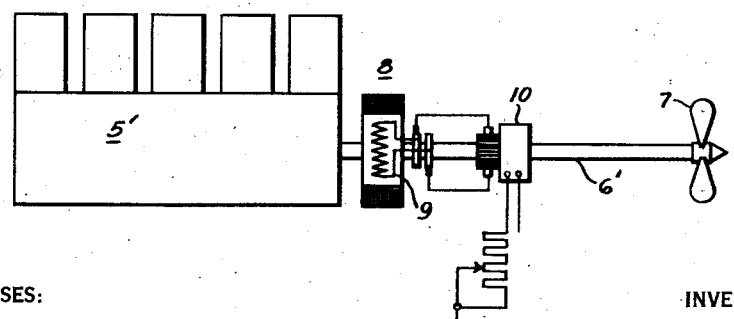
Fig. 5 shows schematically an arrangement wherein the damping effect of the added system is varied proportional to the forced oscillations of a mechanical system.

In Fig. 5 such an arrangement is illustrated schematically. A piston machine is identified by the numeral 5'; with the aid of the shaft 6' it drives a ship propeller 7. The reference character 8 designates an auxiliary oscillation damping device electromagnetically coupled to shaft 6'. The rotating portion 9 of this auxiliary device is provided with an exciting winding which is fed by the externally excited excitation machine 10 which is mounted on shaft 6' and the stationary portion is provided with a stator winding of a type well known in the art.

Since the electromotive force of such an excitation machine is proportional to the frequency, it affects the auxiliary elastic oscillation system, when the field of the excitation machine is maintained constant, always in such manner as is required for the complete tuning damping as the shaft passes through the critical rotational speed over a wide range.

By this arrangement a very simple adjustment of the tuning damping for the different resonance regions of an oscillation system with a plurality of resonance positions is also made possible. For each resonance region the proportionality of the auxiliary characteristic frequency and therefore of the exciting current of the device 8 with the rotational speed is available. On the other hand the magnitude of the characteristic frequency is for each resonance range distinguishable. It is only necessary therefore to adjust for each critical rotational speed a different excitation current of the exciting machine to attain in the passage through the resonance range automatically exactly complete damping of the otherwise dangerous oscillations.

For very high critical rotational speeds the excitation current must be adjusted to a high value to attain a sufficiently high characteristic frequency. In order that the machine need not be built unnecessarily large it may be preferable to change the total magnitude of the rotating mass of the auxiliary oscillating system as the high characteristic frequency is approached. For example, the rotating mass may be composed of a plurality of parts which may be rigidly held together or maintained free from each other by either electromagnetic, claw, or friction clutches. This modification is shown in Fig. 6. In such a case, it is only necessary that for high critical rotational speeds the smallest total mass of this auxiliary system be permitted to rotate. While for intermediate and low critical rotational speeds more and more of the auxiliary masses be coupled together and permitted to oscillate. The connection and disconnection of the auxiliary masses may be simply affected by actuating the current for the magnetic coupling.

The arrangement described here may easily be designed completely automatic by providing through a contact generator a definite excitation current for the exciting machine and under certain circumstances a definite coupling current for the rotating masses for each critical rotational speed; the latter may be made known by oscillation or experiment. These currents are switched in when the critical rotational speed is approached and switched out when the machine recedes from it. In such a case the initial critical rotational speed of such a system may be passed at as slow a rate as is desirable. The machine may even operate permanently at any other rotational speeds without fear of injury.

A better understanding of my contribution to the art by the particular modification shown in Fig. 6 can be had from a study of a sequence of operation of the system of control shown in that figure.

Assuming that the mechanical system comprises an internal combustion engine 13 such as a Diesel engine used on board ship for driving the ship propeller 14 through a shaft 15. In ship propulsion, since the apparatus is mounted on the ship which is itself a moving base and subject to vibration, it is highly important to prevent resonance frequencies between the natural frequency of the ship and mechanical system and the variable frequency or forced oscillations of the moving elements of the engines, shaft and propeller. In such a ship propulsion system, a number of critical frequencies may be encountered and to prevent resonance at the number of critical frequencies, I utilize a plurality of damping means which are designed to be connected to the shaft as a critical frequency is approached and disconnected from the shaft as the forced oscillations recede from the critical frequency.

Assuming that bus bars 11 and 12 are suitably energized with direct current to excite the separately excited generator or exciter 18. This is effected by the circuit established from bus bar 12 through conductor 16, the field winding 17 of the exciter 18, the variable resistor 19 to the bus bar 11. As the speed of the engine 13 increases, the voltage of the exciter, namely, the voltage across conductors 18' and 24 increases proportional to the speed. The exciter 18 is preferably operated at the straight portion of its saturation curve over its entire speed range, so that the voltage of this exciter at all times is substantially proportional to the speed and thus substantially proportional to the forced oscillations of the system.

As the voltage of the exciter rises the rotor 20, keyed to shaft 15 at 20' of the damping device 80 becomes energized more and more by a circuit from the energized conductor 18' through conductor 19', rotor 20, conductor 21, resistor sections 22 and 23 to the energized conductor 24. The damping device 80 is of the electromagnetic type and thus produces a damping effect proportional to the speed, if the rotor is energized proportional to the speed, as is the case in this installation. Further, this damping device 80 is designed to eliminate resonance frequencies at the highest critical speed of the shaft 15.

For the lower critical speeds, greater masses are of course required to eliminate resonance than are required for the higher speeds and it is thus desirable to make provision for interconnecting damping devices with the shaft, such as the damping devices 90 and 100 as the successive critical speeds are encountered. This is accomplished through the system of control shown.

To actuate the system of control, a tachometer generator 26 is geared to the shaft 15 through a reduction gearing 25. This tachometer generator is designed to have a rise in voltage directly proportional to a rise in speed and, therefore, energizes the various contactors connected to the tachometer generator proportional to the speed.

As the first critical speed is being approached, contactors 39 and 43 are caused to operate by the current in their actuating coils 38 and 42, respectively. The circuit for these coils is established from energized conductor 27 through conductor 37, coil 38 of contactor 39, coil 40 of contactor 41, coil 42 of contactor 43 and coil 44 of contactor 45 to the energized conductor 36.

The adjustment of contactors 39 and 43 is such that they will close their contact members as the first or lowest critical speed is approached. Operation of these contact members establishes energizing circuits for the jaw type magnetic clutches 50 and 51, keyed to the shaft 15 at 50' and 51' to thus interconnect the rotors 58 and 65 of the electromagnetic damping devices 90 and 100 to the shaft 15. The circuit for the electromagnetic clutch 50 is completed through the contact members 70 of the contactor 41 and 46 of the contactor 39, whereas the energizing circuit for the electromagnetic clutch 51 is established through contact members 69 of contactor 45 and contact members 49 of contactor 43.

The rotors 58 and 65 are mounted to rotate freely with reference to shaft 15, but when the electromagnetic clutches 50 and 51 are energized, the rotors are caused to be driven with the shaft 15 through the jaws 54 and 55 of the electromagnetic clutches 50 and 51, respectively.

As the forced oscillations and the frequency of the shaft and other moving parts caused to move by the engine 13 approach more closely to the critical frequency it may be necessary to increase the excitation of the rotor 65. Before this increase takes place, the rotor is, of course, energized from the exciter 18 by the circuit established from the energized conductor 18' through contact members 47 of contactor 39, 56 of contactor 41, 48 of contactor 43, 63 of contactor 45, conductor 64, rotor 65, conductor 66, resistor 67 and conductor 62 to the energized conductor 24. It will be noted that the energization of rotor 65 can be increased by the shunting of the resistor 67. This shunting of resistor 67 may be accomplished by the contactor 35 which is so adjusted as to operate at very near the critical frequency. A circuit for this contactor may be traced from the energized conductor 27 through actuating coil 28 of contactor 29, actuating coil 30 of contactor 31, actuating coil 32 of contactor 33 and actuating coil 34 of contactor 35 to the energized conductor 36. Operation of contactor 35 closes the contact members 68 thereby increasing the excitation of rotor 65 to thus increase the damping effect while the shaft 15 is passing through the critical speed.

As the rotating system departs more and more from the first critical speed, contactor 45 is caused to operate. All the contactors shown are of similar design but may be adjusted to operate when subjected to different currents in their respective actuating coils. The operation of contactor 45 opens the circuit for the magnetic clutch 51 at the contact member 69 and also opens the energizing circuit for the rotor 65 at the contact members 63. Rotor 65 having been released by clutch 51 from its non-symmetrical position with reference to the stator, is acted upon by the residual magnetism of the stator and thus moves to the position shown in Fig. 6 and in consequence the mass of the rotor and its electromagnetic damping effect are entirely removed from the shaft 15 as its speed recedes from the first critical speed.

The rotor 58 will, of course, remain energized by the circuit from the energized conductor 57 through rotor 58, conductor 59, resistor 60, conductors 61 and 62 to the energized conductor 24.

The design may, of course, be such that as the speed of the shaft departs more and more from the first critical speed, the damping effect of the damping device 90 may also be entirely removed until the second or next higher critical speed is approached. However, for the system of control as I have shown it in Fig. 6, rotor 58 remains energized and produces a continuous damping effect. However, as the shaft 15 approaches the second and higher critical speed, contactor 33, by reason of its adjustment, is caused to operate thereby shunting resistor 60 by the closure of the contact members 81 whereupon the rotor 58 is energized somewhat more and thus the damping effect of the damping device 90 is increased. No resonance oscillations are thus set up as the shaft passes through the second critical speed, and as soon as the speed of shaft 15 has increased to a region of safety from the second critical speed, contactor 41 by reason of its adjustment operates to open contact members 56 and 70. Opening of contact members 56 deenergizes the rotor 58 and the opening of contact member 70 deenergizes the magnetic clutch 50 and the result is that rotor 58 acted upon by the residual magnetism of the stator moves to the position shown and the damping effect by reason of its weight and its electromagnetic characteristics is removed from shaft 15.

As the speed of shaft 15 increases and approaches a third critical speed, contactors 31 and 29, by reason of their adjustment, are caused to operate to successively shunt the resistor sections 22 and 23 and thus effect the successive closure of contact members 82 and 83.

Since the rise in voltage of the exciter 18 is proportioned to the speed, it is clear that the damping effect of the device 80, being proportional to the speed, will ordinarily eliminate resonance frequencies for all critical speeds that may occur after the shaft 15 has risen in speed beyond the critical speed controlled by the device 90. However, to get more accurate control contactors 31 and 29 are utilized. Contactors 31 and 29 may also be adjusted to take care of two further successive critical frequencies. This will depend upon the resistance value of the resistors 22 and 23 and also upon the speed range the device 80 is called upon to control. Normally in most ship propulsion systems no more than three critical speeds are likely to be encountered and the contactors 31 and 29 may function merely to give more accurate control for the last and highest critical speed. If two further successive critical speeds are to be controlled by contactors 31 and 29, their operation will be so adjusted as to occur at considerably different voltage effects on the operating coils 30 and 28, respectively. In other words, contactor 31 and the shunting of resistor 22 may so increase the damping effect of damper device 80 to take care of one critical speed and as the voltage of tachometer generator 26 rises, the adjustment of contactor 29 may be such as to cause a shunting of resistor section 23 when the last and fourth critical speed is approached.

I am, of course, aware that others particularly after having had the benefit of the teaching of my invention may design other circuit diagrams and other systems of control for accomplishing the novel results I have hereinbefore set forth, but I do not wish to be limited to the particular showing herein made and wish to be limited only by the scope of the appended claims as limited by the pertinent prior art.

I claim as my invention:

1. In a system of control for preventing resonance between the natural frequency of the system and the variable frequency of an element of the system, in combination, means for coupling an auxiliary system to the element subjected to a variable frequency, whereby the resulting oscillating system has its critical frequency changed to some other value, and electric means for varying the characteristics of said auxiliary system proportional to the frequency of the element in the system subjected to a variable frequency.

2. In a system of control for preventing resonance between the speed of a shaft and the natural frequency of a mechanical system with which the shaft is associated, in combination, means for automatically coupling a mass to the shaft as the critical frequency is approached, means for disconnecting the mass from the shaft as the speed of the shaft recedes from the critical frequency, and electric means for varying the damping effect of the mass coupled to the shaft proportional to the speed of the shaft.

3. In a system of control for preventing resonance between the natural frequency of a mechanical system and the variable frequency of a shaft with which the mechanical system is associated, in combination, a plurality of masses normally disconnected from the shaft and means for successively connecting said masses to the shaft as successive critical frequencies are approached and means for successively disconnecting the masses from the shaft as the speed of the shaft recedes from the respective critical speeds the respective masses are to affect, electric means for varying the damping effect of the respective masses as a function of the speed of the shaft.

4. In a system of control for preventing resonance between the natural frequency of a machine and the variable frequency of an element of the machine operating at variable speeds, in combination, a plurality of masses adapted to be connected to the element operating at variable frequency, and electromagnetic means responsive to the speed of the shaft for automatically coupling the masses to the shaft as successive critical speeds are approached and for automatically disconnecting the masses from the shaft as the shaft recedes from the respective critical speeds, and electric means for changing the damping effect of the masses proportional to the speed of the shaft.

5. In a system of control for preventing resonance frequencies in a mechanical system including, between the frequencies of an element operating at variable frequency and the natural frequency of the system, in combination, means, coupled to the element subjected to variable frequency, for changing the natural frequency of the entire system so that resonance is not produced as the element passes through the critical frequency, and means for changing the damping effect of the means coupled to the element subjected to variable frequency proportional to the speed, or frequency, of the element subjected to variable frequency.

REINHOLD RÜDENBERG.